United States Patent [19]

Mathews

[11] 4,388,515
[45] Jun. 14, 1983

[54] RESISTANCE WELDING CONTROL SYSTEM

[75] Inventor: James K. Mathews, Van Nuys, Calif.

[73] Assignee: Pertron Controls Corporation, Canoga Park, Calif.

[21] Appl. No.: 245,261

[22] Filed: Mar. 19, 1981

[51] Int. Cl.³ ............................................. B23K 11/24
[52] U.S. Cl. ..................................... 219/110; 219/109
[58] Field of Search ........................ 219/108, 110, 109; 324/83 R, 83 A, 83 D

[56] References Cited

U.S. PATENT DOCUMENTS

| 4,011,503 | 3/1977 | Ferrara | 324/83 R |
| 4,104,724 | 8/1978 | Dix et al. | 219/108 |
| 4,254,466 | 3/1981 | Jurek | 219/110 |

Primary Examiner—C. C. Shaw
Attorney, Agent, or Firm—Keith D. Beecher

[57] ABSTRACT

A control system for use with a welding machine controller is provided which senses the dynamic resistance of the weld being formed by the welding machine, and which generates appropriate signals indicating the condition of the weld, which signals may be used for automatically controlling the operation of the controller. The control system of the invention senses the power factor in the primary circuit of the welding transformer included in the welding machine which is a measure of the dynamic resistance of the weld being formed, and the control system produces signals indicating the dynamic resistance of the weld, which signals may be digitized to produce appropriate control signals for the controller.

7 Claims, 4 Drawing Figures

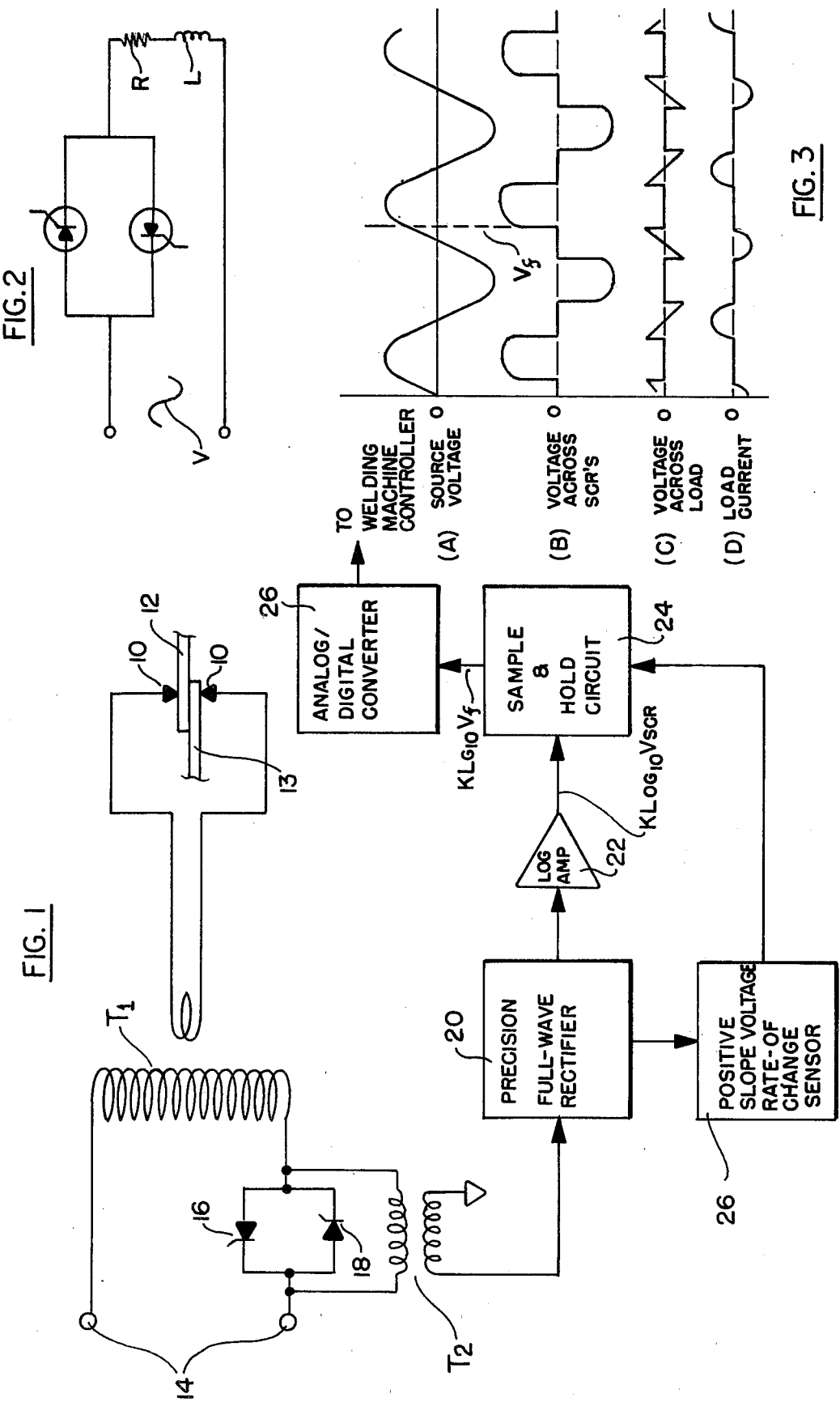

RESISTANCE WELDING CONTROL SYSTEM

BACKGROUND

Resistance welding processes are widely used in the manufacture of sheet metal assemblies, such as automobile and aircraft bodies. Each resistance weld involves a sequence of electrical energy and mechanical pressure steps. The sequences are provided by a controller which governs the timing of the both the electrical and the mechanical steps. For example, the controller may establish a selected number of cycles of alternating current line power at a selected current, with a selected electrode force for each step of a welding operation. In carrying out the welding operation, the operator merely presses a button which sets the controller in operation. The controller then responds to an internal program to carry out all the steps necessary for the operation. The program of the controller is stored in an internal memory, and it may vary from a relatively few commands to a large number of commands, depending upon the simplicity or complexity of the welding operation.

A microprocessor controller for resistance welding machines is described, for example, in copending application Ser. No. 29,752 which was filed Apr. 13, 1979 in the name of the present inventor. The controller described in the copending application provides heat and pressure commands to the controlled resistance welding machine. The control system of the present invention finds application for use in conjunction with controllers of the type described in the copending application, since it is capable of introducing digital signals to the controller for controlling the operational cycles of the controller in accordance with the actual monitored condition of the weld being formed, rather than relying upon timed intervals. The control system of the invention senses the voltage across the silicon controlled rectifiers or ignitrons of the controller to detect the power factor of the primary circuit of the welding transformer in the welding machine which, as mentioned above, is a measure of the dynamic resistance of the weld being formed, and the system generates digital signals representative of the dynamic resistance of the weld which are appropriate for controlling the controller.

As is well known, resistance welding involves the localized melting and coalescence of a small volume of material due to the heating caused by the passage of electric current through the material. This heating is a function of the resistance of the material welded at the location of the weld. During the welding process, however, the resistance of the material being welded continually changes as the material is heated and melts. Until recently, weld characteristics have been determined by measuring the initial or static resistance at the beginning of the welding cycle, or the average current flowing during the welding operation. However, in order fully to characterize the welding process, a continuous or dynamic monitoring system is required which senses instantaneous changes in the weld resistance during the formation of the weld.

The present invention provides such a system, and one which generates digital signals representing the dynamic resistance of the weld being formed, which signals may be used to provide an automatic control for the controller, or to initiate appropriate indications to enable necessary manual controls to be made on the controller.

It is, accordingly, an objective of the present invention to provide an improved and simplified system for sensing the dynamic resistance of a weld as it is being formed, so that the weld portion of the welding cycle may be automatically terminated when the desired weld is achieved, and so that other automatic controls may be effectuated by the controller during the welding cycle.

BRIEF DESCRIPTION OF THE DRAWINGS

FIG. 1 is a block diagram of a control system embodying the concepts of the invention;

FIG. 2 is a schematic equivalent diagram of the primary circuit of the welding transformer in a typical welding machine;

FIG. 3 is a series of curves useful in explaining the operation of the system of the invention.

DETAILED DESCRIPTION OF THE ILLUSTRATED EMBODIMENT

Figure 4:
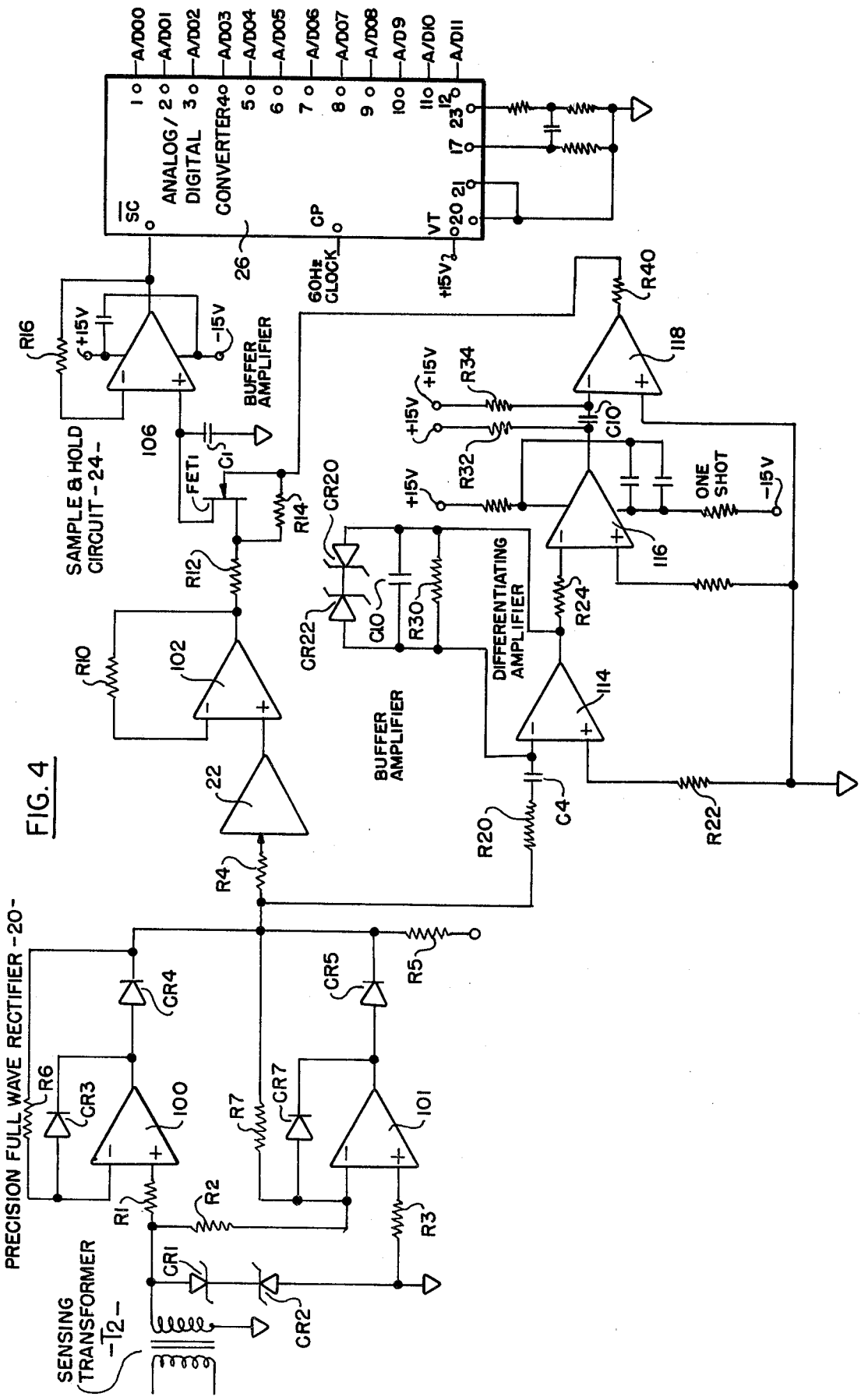
FIG. 4 is a circuit diagram of the system of FIG. 1.

The system of FIG. 1 includes a welding transformer $T_1$ which is part of a typical welding machine. The transformer $T_1$ has a secondary winding connected to electrodes 10, which electrodes are pressed against opposite sides of workpieces 12 and 13 in order to weld the workpieces together by a typical resistance welding operation.

The primary of the welding transformer $T_1$ is connected to a source of alternating current by way of terminals 14. A pair of SCR's or ignitrons 16 and 18 are connected in the primary circuit of the transformer $T_1$, and these devices are controlled by a controller, such as the controller described in the copending application, in order that the current flowing through the workpieces 12 and 14 during the welding operation may be appropriately controlled.

The control system of the present invention includes a sensing transformer $T_2$ whose primary winding is connected across the devices 16, 18, and whose secondary winding is connected to a precision full-wave rectifier 20. The full-wave rectifier 20 serves to rectify the voltage across the secondary of the sensing transformer $T_2$ so that both cycles of the voltage appearing across the devices 16 and 18 may be sensed. The voltage from the full-wave rectifier 20 is amplified in a logarithmic amplifier 22, and the output of the amplifier is introduced to a sample and hold circuit 24. The logarithmic amplifier 22 is used to assure uniform accuracy of the system over a wide range of voltage outputs from the transformer $T_2$. The output voltage from the logarithmic amplifier 22 is designated $K \log_{10} V_{SCR}$.

The precision full-wave rectifier is also connected to a positive slope voltage rate-of-change sensor 26 which is in the nature of a differentiating circuit, and which generates sharp pulses during the positive-going slopes of the voltage wave produced by rectifier 20, and the resulting spikes are applied to the sample and hold circuit 24. As a result, the sample and hold circuit 24 responds to the spikes to produce a voltage output representative of the amplitude of the voltage from amplifier 22 at the time of occurrence of each of the spikes. This latter voltage is designated $K \log_{10} V_f$, and it is digitized in an analog/digital converter 26 to produce appropriate digital output signals which are applied to the welding machine controller, such as the controller described in the copending application.

The equivalent circuit of the primary circuit of welding transformer $T_1$ is shown in FIG. 2. As shown in FIG. 2, a voltage wave from the source is applied to the primary circuit, and the primary circuit exhibits resistance and inductance in series with the current flowing in the primary circuit as a result of the source voltage. The phase displacement between the current and the source voltage, and thus the power factor of the primary circuit, varies as the resistance value R varies which, in turn, is a function of the dynamic resistance of the weld being formed.

As shown in the curves of FIG. 3, the voltage across the devices 16 and 18 has a predetermined phase relationship with the source voltage, and the leading edges of each of the positive and negative cycles across the devices shifts as the resistance varies, and the amplitude of the perpendicular portion of each leading edge changes with such variation, as each leading edge shifts with respect to the corresponding half-cycle of the source voltage.

The precision full-wave rectifier 20 enables the sample and hold circuit 24 to sample the leading edge of each of the positive and negative half-cycles of the voltage across the devices 16 and 18, and the spikes generated by the differentiating circuit 26 cause the sample and hold circuit output voltage to vary in correspondence with the shifting of the leading edge of each of the half-cycles.

Accordingly, the sample and hold circuit produces an output which is a measure of the amplitude of the leading edge of each half-cycle of the voltage across the devices 16, 18 which, in turn, is a measure of the dynamic resistance of the weld being formed. This voltage, designated $K \log_{10} V_f$ is digitized, as mentioned, in converter 26, to produce appropriate digital signals which are applied to the welding machine controller described in the copending application.

A circuit diagram of the system of FIG. 1 is shown in FIG. 4. The circuit diagram includes the precision full-wave rectifier 20, which is shown as being made up of a pair of operational amplifiers 100 and 101 which may be of the type designated 324. The secondary of the sensing transformer $T_2$ is connected through a 10 kilo-ohm resistor R1 to the positive input of amplifier 100, and through a 10 kilo-ohm resistor R2 to the negative input of operational amplifier 102. The positive input of operational amplifier 102 is connected to a grounded 10 kilo-ohm resistor R3. A pair of Zener diodes CR1 and CR2 are connected across the secondary of sensing transformer $T_2$. These diodes may be of the type designated IN758A.

The negative input of amplifier 100 is connected to a 10 kilo-ohm resistor R6 and to a diode CR3, the diode CR3 being connected to the output of amplifier 100 and through a diode CR4 to a 1 kilo-ohm resistor R4, and resistor R6 being connected directly to resistor R4. The diode CR4 and resistor R6 are also connected through a 10 kilo-ohm resistor R5 to the negative terminal of a 15 volt potential source. The output of amplifier 102 is connected through a diode CR5 to resistor R5, and the negative input of the amplifier is connected to resistor R5 through a 10 kilo-ohm resistor R7. The output of amplifier 102 is connected back to the input through a diode CR7. The elements described above form the precision full-wave rectifier 20, which serves to rectify the voltage appearing across the secondary of sensing transformer $T_2$, so that the two cycles of the voltage wave shown in curve B of FIG. 3 have the same polarity.

The resistor R4 is connected to the logarithmic amplifier 22 which may be an intergrated circuit of the type designated LH0094, and the logarithmic amplifier 22 is connected to the positive input of a buffer amplifier 102. The buffer amplifier 102 may be of the type designated 324. The output of the buffer amplifier is connected back to the input through a 1 kilo-ohm resistor R10. The output of buffer amplifier 102 is also connected through a 100 ohm resistor R12 to the drain electrode of a field effect transistor FET1, which may be of the type designated 2N4393. The collector of field effect transistor FET1 is connected to a grounded capacitor C1 which may have a capacity of 0.047 microfarads, and the field effect transistor FET1 and capacitor C1 form the sample and hold circuit 24. The gate electrode of the field effect transistor is connected back to the drain electrode through a 100 kilo-ohm resistor R14.

The output of sample and hold circuit 24 is connected to the positive input of a buffer amplifier 106 which may be of the type designated 351B. The negative input of the buffer amplifier is connected to the output through a 100 kilo-ohm resistor R16, and the output of the buffer amplifier is connected to the SC pin of analog/digital converter 26 which may be an integrated circuit chip of the type designated ADC1211. The analog/digital converter 26 converts the analog output from the buffer amplifier into digital signals designated $A/D_{00}$–$A/D_{11}$ respectively.

The precision full-wave rectifier is also connected to the differentiating amplifier 26 which, as shown in FIG. 4, includes an amplifier 114 which may be of the type designated 324. The full-wave rectifier is coupled to the negative input of the differentiating amplifier through a 470 ohm resistor R20 and through a 0.22 microfarad capacitor C4. The positive input of amplifier 114 is connected to a grounded 100 kilo-ohm resistor R22. The output of the amplifier 114 is connected through a 10 kilo-ohm resistor R24 to the negative input of an amplifier 116 which, in conjunction with a second amplifier 118 forms a one-shot multivibrator. Amplifiers 116 and 118 may be of the type designated 339.

The output of differentiating amplifier 114 is connected back to the input through a pair of Zener diodes CR20 and CR22 which may be of the type designated IN758A. The Zener diodes are shunted by a 0.001 microfarad capacitor C10 which, in turn, is shunted by a 100 kilo-ohm resistor R30. The amplifier 116 of the one-shot multivibrator is coupled to the negative input of amplifier 118 through a 0.0047 microfarad coupling capacitor C10. The output of amplifier 116 is connected through a 10 kilo-ohm resistor R32 to the positive terminal of the 15 volt potential source, and the negative input of amplifier 118 is connected through a 3.3 kilo-ohm resistor R34 to the positive terminal of the 15 volt potential source. The output of the one-shot is connected through a 1 kilo-ohm resistor R40 to the gate electrode of the field effect transistor FET1 in the sample and hold circuit 24.

The differentiating amplifier, as explained above, responds to the output of the precision full-wave rectifier 20 to cause the one-shot to produce a voltage spike at the leading edge of each positive-going and negative-going waveform of curve B of FIG. 3, and this spike causes the field effect transistor FET1 to charge capacitor C1 to a voltage corresponding to the value of the waveform B at each leading edge which, in turn, is a measure of the power factor of the primary circuit of the welding transformer which, in turn, is a measure of the dynamic resistance of the weld being formed. The resulting analog voltage applied to the analog/digital converter 26 is converted into digital signals for controlling the welding machine controller, such as the controller described in the copending application.

The invention provides, therefore, a simple circuit which effectively senses the dynamic resistance of the weld being formed by a welding machine controller to generate signals indicative of the dynamic resistance of the weld, which signals may be used for providing appropriate controls to the welding machine controller, or of providing appropriate indications for the operator.

It will be appreciated that while a particular embodiment of the invention has been shown and described, modifications may be made, and it is intended in the claims to cover all such modifications which come within the true spirit and scope of the invention.

What is claimed is:

1. A control system for use in conjunction with a controller which controls a resistance type of welding machine during the production of a weld, the welding machine including a welding transformer having a primary circuit connected to a source of alternating current voltage and further having a secondary circuit, and the controller including switching means connected in said primary circuit for controlling the flow of current in the secondary circuit of the welding transformer, the control system including: circuit means connected across the switching means for providing an alternating current voltage corresponding to the voltage appearing across the switching means and having a phase relation with the alternating current voltage of said source which varies with variations in the dynamic resistance of the weld being produced, and the leading edge of each half cycle of the alternating current voltage produced by said circuit means having an amplitude determined by such variations in said phase relation; differentiating circuitry connected to said circuit means for generating a pulse signal upon the occurrence of the leading edge of each half cycle of the alternating current voltage produced by said circuit means; and sample and hold circuitry connected to said circuit means and to said differentiating circuitry for producing an output signal representative of the amplitude of the leading edge of each half cycle of the alternating current voltage produced by said circuit means.

2. The control system defined in claim 1, in which said circuit means includes a full-wave rectifier circuitry.

3. The control system defined in claim 2, in which said circuit means includes a logarithmic amplifier interposed between said full-wave rectifier circuit and said sample and hold circuitry.

4. The control system defined in claim 1, in which said circuit means includes a transformer having a primary winding connected across said switching means and having a secondary winding.

5. The control system defined in claim 4, in which said circuit means includes a full-wave recifier circuit connected across said secondary winding of said last-named transformer.

6. The control system defined in claim 5, in which said circuit means includes a logarithmic amplifier interposed between said full-wave rectifier circuit and said sample and hold circuitry.

7. The control system defined in claim 1, and which includes an analog/digital converter circuit connected to said sample and hold circuitry to convert said output signal from said sample and hold circuitry into corresponding digital signals.

* * * * *